May 20, 1930.  A. W. CARLSON  1,759,686
WELDROD FOR ELECTRIC ARC WELDING
Filed May 23, 1929
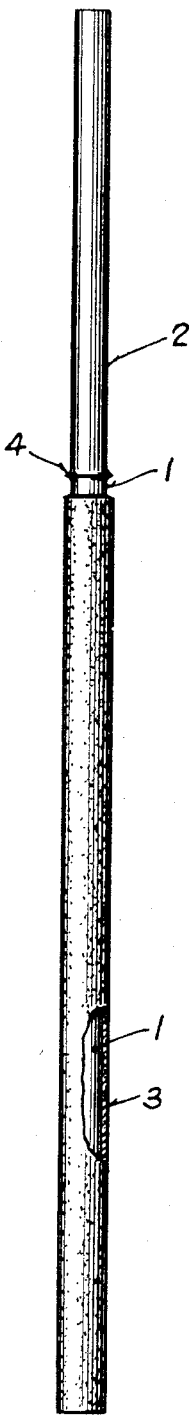
INVENTOR.
Arthur W. Carlson
BY
ATTORNEY.

Patented May 20, 1930

1,759,686

UNITED STATES PATENT OFFICE

ARTHUR W. CARLSON, OF MILWAUKEE, WISCONSIN, ASSIGNOR TO A. O. SMITH CORPORATION, OF MILWAUKEE, WISCONSIN, A CORPORATION OF NEW YORK.

WELD ROD FOR ELECTRIC-ARC WELDING

Application filed May 23, 1929. Serial No. 365,335.

This invention relates to a metallic weldrod for electric arc welding or deposition of metals wherein the metal of the weldrod is projected by an electric arc established between the weldrod and the work, and the projected metal is fused with the metal of the work by the heat of the arc.

The object of the invention is to provide a weldrod of a construction which will reduce waste of expensive weldrod material; which will modify the current and heat conductivity of the rod as a whole; and which will enable the use of a slow-burning combustible coating or covering upon the working end of the rod, which coating will retain its useful function for substantially the full extent of the length of the rod which supplies the welding metal.

In previous attempts to employ special steel alloys for weldrods, it was found that heating of the rod, especially in so-called high-speed work, and using high current values of the order of three or more hundred amperes, the rod temperatures due to current were sufficiently high to deteriorate the covering above the working end to an extent which precluded the use of more than a fractional part of the rod.

In employing the present invention, a larger percentage of the welding metal of the rod is made available for use, and indeed under favorable conditions the entire extent of the working end of the rod is used up in the welding operation, with the covering remaining intact and functioning as intended to aid in protecting and stabilizing the arc. There is thus avoided a substantial waste of expensive welding material which waste has been unavoidable heretofore in arc welding using special alloy steel rods.

The invention is particularly applicable to the welding of special alloy steel such e. g. as chromium-nickel steel in which saving of the metal is important. It is also applicable to welding in which the particular metal or alloy to be projected by the arc has relatively poor electrical and heat conductivity; or which by reason of its temperature coefficient, becomes more resistive to current flow at the rod temperatures which prevail in actual welding operations of the kind contemplated.

The invention resides in providing a weldrod formed by joining, as by end to end, two metal rods of dissimilar characteristics, one portion comprising the working end of the rod and composed of a special welding metal, and the other portion of a dissimilar metal chosen with regard to current and heat conductivity and cost of material.

As an example of the weldrod contemplated by this invention, the one end of the rod, which we may refer to as the working end and meaning the end from which the arc is struck, may be composed of a special alloy such e. g. as chromium-nickel steel; and the other end may be of ordinary steel, iron, copper, or other suitable electro and heat conductive metal of less cost than the mentioned alloy.

Various combinations of metals and alloys are suitable for use in forming the composite rod; but in general any combination of metal or alloys which enables the desired welding metal to be deposited while maintaining proper current values in the rod, and which employs a relatively cheap metal for at least a portion of the required and convenient length of rod as used in arc welding, is within the scope of this invention. The portion of the rod, heretofore referred to as the working end, may be and preferably is covered or coated with a suitable composition to aid in the welding operation in protecting and stabilizing the arc.

The accompanying drawing illustrates, in side elevation, a weldrod made in accordance with the invention.

The weldrod illustrated is formed of two longitudinal portions, the welding portion 1 being made of special welding metal such as chromium alloy steel, and the other portion 2 being made of metal of less cost such e. g. as ordinary steel, iron, copper, or other suitable metal, the electrical and heat conductive characteristics of which are superior to the portion 1. The welding portion 1 preferably has a covering 3 of suitable arc protecting material. The covering is of such nature as to surround the arc with a deoxidizing 100 atmosphere during the welding operation to prevent contamination of the welding metal. The covering may be varied to suit the composition of the welding metal, a covering composed of cellulose material mixed with sodium silicate having been found adaptable for use with chromium alloy welding metal.

In use, the weldrod is clamped at the upper portion 2 by suitable clamps which conduct welding current thereto, and an arc is established between the other end of the rod and the work. As the metal of the portion 1 is projected onto the work by the arc, the weldrod is fed by any suitable means to maintain the arc. The welding operation thus continues until the portion 1 of desirable welding metal is substantially used up. The remaining portion 2 being of cheaper metal may be scrapped or may be again used by joining with a suitable length of special welding metal.

In the manufacture of the composite weldrod, the portions 1 and 2 are preferably welded together, in which case the flash or burr 4 at the margin of weld serves as an indication to the operator of the distance he may burn or fuse the rod. However, other modes of fastening the two portions together may be employed, the essence being that a good electrical contact be made therebetween since the welding current is conducted to the weldrod through the portion 2.

In arc welding operations of the kind herein referred to, weldrods of various lengths are employed. A common length in the practice, however, is about 18 inches, which is found convenient for many kinds of work. With such a length, the portion 1 should preferably be approximately twice the length of the portion 2 where the former is composed of a special steel alloy such e. g. as chromium-nickel steel. In this example, the portion 2 may be of ordinary steel or copper. Such a steel alloy, as noted in the above example, by reason of its temperature coefficient, and its relatively high resistance to current flow, becomes unduly heated during the welding operation. This heating, if no provision is made against it, may actually soften the rod, to make its further use impracticable; and, if the rod is covered, the heat developed in the covered part of the rod is sufficient to damage if not to destroy the covering along the unconsumed part of the rod in advance of its use.

By the use of a composite rod, one end of which is left uncovered, and which end consists of a metal having relatively good conductivity for both heat and current, and which is relatively inexpensive as compared to cost of welding metal, there is provided a weldrod which substantially eliminates the objections and difficulties referred to, and permits welding by deposition of special steels with the same facility and at practically the same rate as in welding operations using ordinary steel. Where extensive welding operations are employed, as in large factories, the practice of this invention permits a very material saving in costs, since there is a minimum waste of the expensive metal required for the weldrods.

I claim:

1. A composite weldrod comprising sections of dissimilar metal joined end to end, one section being composed of metal of special characteristics for deposit as welding metal and the other section comprising metal having superior heat and electro-conductive characteristics.

2. A composite weldrod comprising sections of dissimilar metal joined end to end, one section being composed of metal of special characteristics for deposit as welding metal and having a positive temperature coefficient, and the other section comprising a metal the temperature coefficient of which is different from that of the first named section.

3. A metallic weldrod comprising sections of dissimilar metals joined end to end, one section constituting the working end of the rod and composed of a metal alloy to be deposited in the welding operation, and the other section consisting of a relatively cheaper metal, the two sections being joined together by an electro-conductive joint.

4. A metallic weldrod comprising sections of dissimilar metals joined end to end by fusion, one section constituting the working end of the rod and composed of a metal alloy to be deposited in the welding operation, and the other section consisting of a relatively cheaper metal, the joint between the two sections constituting indicating means for the extent of fusion of the rod.

5. A metallic weldrod comprising sections of dissimilar metals joined end to end, one section constituting the working end of the rod and composed of a metal alloy to be deposited, an arc protecting covering for the said section, and the other section consisting of a relatively cheaper metal free from covering and suitable for engagement with a current conducting clamp.

6. A metallic weldrod comprising sections of dissimilar metals joined end to end, one section constituting the working end of the rod and composed of a metal alloy to be deposited in the welding operation, and the other section consisting of a relatively cheaper metal and having heat and electro-conductive characteristics not less than those of the working end of the rod, the two sections being joined together by an electro-conductive joint.

In testimony whereof, I have signed my name at Milwaukee, Wisconsin, this 20th day of May, 1929.

A. W. CARLSON.